(12) United States Patent
Son

(10) Patent No.: US 10,680,288 B2
(45) Date of Patent: Jun. 9, 2020

(54) METHOD CAPABLE OF EASILY CHECKING FOR A DEFECT IN A BATTERY PACK

(71) Applicant: LG Chem, Ltd., Seoul (KR)

(72) Inventor: Min-Gyu Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 250 days.

(21) Appl. No.: 15/792,141

(22) Filed: Oct. 24, 2017

(65) Prior Publication Data
US 2018/0115023 A1    Apr. 26, 2018

(30) Foreign Application Priority Data

Oct. 25, 2016  (KR) .................. 10-2016-0139540

(51) Int. Cl.
| *H01M 10/42* | (2006.01) |
| *G01M 3/20* | (2006.01) |
| *H01M 10/613* | (2014.01) |
| *H01M 10/6567* | (2014.01) |

(52) U.S. Cl.
CPC ......... *H01M 10/4228* (2013.01); *G01M 3/20* (2013.01); *H01M 10/4285* (2013.01); *H01M 10/613* (2015.04); *H01M 10/6567* (2015.04)

(58) Field of Classification Search
CPC . H01M 10/4228; H01M 10/4285; G01M 3/20
See application file for complete search history.

(56) References Cited

U.S. PATENT DOCUMENTS

| 5,509,296 | A | * | 4/1996 | Kolb ............... B60K 15/03504 73/40.5 R |
| 2009/0315326 | A1 | * | 12/2009 | Pieroni ................. F02D 33/003 285/328 |
| 2011/0052959 | A1 | * | 3/2011 | Koetting ............. H01M 10/653 429/120 |

(Continued)

FOREIGN PATENT DOCUMENTS

| JP | 5942065 B1 | 6/2016 |
| KR | 10-0990038 B1 | 10/2010 |
| KR | 2014-0143854 A | 12/2014 |

OTHER PUBLICATIONS

Korean Office Action dated Feb. 19, 2020, issued in counterpart Korean Patent application No. 10-2016-0139540.

*Primary Examiner* — Eric S. McCall
*Assistant Examiner* — Timothy P Graves
(74) *Attorney, Agent, or Firm* — Morgan, Lewis & Bockius LLP

(57) ABSTRACT

Provided is a method for checking defects such as a liquid leakage, a gas leakage, and pack housing damage in a battery pack in which a plurality of unit modules including a battery cell are arranged in a pack housing. The method includes feeding a first gas into the pack housing of the battery pack, in which the first gas has one or more colors selected from red, green, and blue colors in a diffuse state and is visually identifiable in diffusion and flow, checking whether defects occur by visually identifying a point at which a flow direction and a flow rate of the first gas change, when the (Continued)

first gas diffuses in the pack housing; and exhausting the first gas to the outside of the pack housing. The defects of the battery pack are simultaneously identifiable by the first gas diffusing into the entire pack housing.

12 Claims, 3 Drawing Sheets

(56) References Cited

U.S. PATENT DOCUMENTS

| | | | |
|---|---|---|---|
| 2014/0038006 A1* | 2/2014 | Sturm | H01M 6/5083 429/61 |
| 2014/0072843 A1* | 3/2014 | Liemersdorf | H01M 10/4228 429/61 |
| 2016/0087319 A1 | 3/2016 | Roh et al. | |
| 2018/0217020 A1 | 8/2018 | Hashimoto et al. | |

* cited by examiner

METHOD CAPABLE OF EASILY CHECKING FOR A DEFECT IN A BATTERY PACK

CROSS-REFERENCE TO RELATED APPLICATION

This application claims priority to Korean Patent Application No. 2016-0139540 filed on Oct. 25, 2016 and all the benefits accruing therefrom under 35 U.S.C. § 119, the contents of which are incorporated by reference in their entirety.

BACKGROUND

The present disclosure relates to a method capable of easily checking a defect of a battery pack.

Recently, secondary batteries that are chargeable and dischargeable are being widely used as energy sources for wireless mobile devices. Also, the secondary batteries have attracted considerable attention as power sources for electric vehicles (EVs), hybrid electric vehicles (HEVs), and plug-in hybrid electric vehicles (Plug-In HEVs), which have been proposed as solutions to air pollution and the like caused by existing gasoline and diesel vehicles that use fossil fuels.

Small sized mobile devices use one or a couple of battery cells for each device. On the other hand, medium and large sized devices such as vehicles use a battery module in which a plurality of battery modules are modularized, or a battery pack in which a plurality of battery modules are electrically connected to each other, due to requirement for high power and large capacity.

It is preferable to manufacture the medium and large sized battery module or the battery pack as small and lightweight as possible. Therefore, prismatic and pouch type batteries, which are capable of being charged at a high degree of integration and are relatively lightweight compared to their capacities, are being mainly used as a battery cell (a unit battery) of the medium and large sized battery module and battery pack. Particularly, much interest is recently focused on the pouch type batteries, which use an aluminum laminate sheet as an exterior member, due to their advantages such as light weight, low manufacturing costs, and easy modification of the shapes.

The battery cells constituting the medium and large sized battery module or battery pack are constituted by secondary batteries that can be charged and discharged, so that such high power and large capacity secondary batteries may generate a large amount of heat. Particularly, since the laminate sheet of the pouch type battery is coated with a polymer material having low thermal conductivity, it is difficult to effectively cool a temperature of the entire battery cell.

When the heat of the battery module, which is generated during the charge and discharge processes, is not effectively removed, the heat may be accumulated, consequently accelerating degradation of the battery cell and causing ignition or explosion in some cases. Therefore, a cooling system is needed in the high power and large capacity battery module or battery pack so as to cool the battery cells contained in the high power and large capacity battery module or battery pack.

Also, a quality test is performed before the medium and large sized battery packs are delivered.

The quality test includes inspecting defects that may occur within the battery pack manufactured at a high degree of integration. For example, the defects include a leakage defect in which an electrolyte or a gas leaks from the battery cells constituting the battery pack, a leakage trouble in which a refrigerant leaks from the cooling system, and a case in which the pack housing is damaged.

In the related art, an operator visually checks each of the battery cells, the pack housing, and the cooling system to inspect one by one whether defects occur. However, this procedure is not only time-consuming but also less accurate, so a defect, which was not found during the inspecting process, may be present in the battery pack even after the delivery.

Thus, there is great need for technologies that may solve the above-described limitations.

SUMMARY

The present disclosure provides solutions for the above-described limitations according to the related art and technical tasks requested from the past.

Particularly, the present disclosure provides a method for checking a defect, which is capable of simultaneously checks defects of a battery pack such as a liquid leakage, a gas leakage, and pack housing damage, by using a principal in which a first gas, which has a color and is visually identifiable in diffusion and flow, changes in flow direction and flow rate at portions of the liquid leakage, the gas leakage, and the pack housing damage.

In accordance with an exemplary embodiment, a method for checking defects such as a liquid leakage, a gas leakage, and pack housing damage in a battery pack in which a plurality of unit modules including a battery cell are arranged in a pack housing, includes: feeding a first gas into the pack housing of the battery pack, wherein the first gas has one or more colors selected from red, green, and blue colors in a diffuse state and is visually identified in diffusion and flow; checking whether the defects occur by visually identifying a point at which a flow direction and a flow rate of the first gas change, when the first gas diffuses in the pack housing; and exhausting the first gas to the outside of the pack housing, wherein the defects of the battery pack are simultaneously identified by the first gas diffusing into the entire pack housing.

The gas diffuses and, at the same time, changes in flow direction and flow rate due to a pressure change at portions of the liquid leak, the gas leakage, and the pack housing damage. It is noted that, on the basis of the above-described principal, the first gas that has the color to be visually identifiable is used to check a defect of the battery pack in the present disclosure.

That is, according to the method of the present disclosure, an operator for checking a defect may visually perceive the diffusion, the flow direction, and the flow rate of the first gas having the color, and thus the operator may easily recognize the change in flow direction and flow rate to simultaneously identify defects such as the liquid leak, the gas leakage, and the pack housing damage over the entire battery pack.

If a bubble test that is generally used to check a gas leakage, i.e., a method of checking a gas leakage in accordance with whether soap bubbles are generated after a portion, at which an occurrence of the leakage is predicted, is coated with the soapy water is applied to a method for checking defects of the battery pack, the bubble test should be performed one by one on portions required to be inspected in the battery pack manufactured with a high degree of integration, resulting in low working efficiency and increasing of an inspection time. Therefore, the bubble test is an inefficient method in a battery pack structure, due to its low processability.

On the other hand, the present disclosure uses the principal in which the first gas changes in flow rate and flow direction at leakage points, and thus portions at which the leakage of the first gas probably occur may be identified at once only through the first gas that diffuses inside the entire battery pack. Therefore, the method provides excellent processability with respect to working efficiency and a required time, when compared to the bubble test.

The color may include a lemon yellow, yellowish green, reddish brown, or black color produced by combining the red, green, and blue colors.

The first gas may include a halogen gas capable of developing a color in the air so that the first gas has colors described above. Particularly, the first gas may include one or more halogen gases selected from fluorine, chlorine, bromine, and iodine.

Hereinafter, a method and principal, in which a defect of each component constituting the battery pack is identified by means of the first gas, will be described in detail with reference to non-limiting examples.

The fluorine may have a lemon yellow color in the first gas, the chlorine may have a yellowish green color in the first gas, the bromine may have a reddish brown color in the first gas, and the iodine may have a black or a blackish purple color in the first gas.

In one specific example, in accordance with the method, when the first gas changes in flow direction and flow rate in a unit module from which an electrolyte or a gas leaks, the unit module of the unit modules may be determined as a defective module.

Particularly, when the electrolyte or the gas leaks from the battery cell constituting the unit modules, the first gas may change in the flow direction around the unit module in which the leakage occurs, due to a leakage pressure of the electrolyte or the gas, and the flow rate may also change at the same time. In addition, the first gas may decrease in density and become blurred around the unit module.

Therefore, the operator may recognize these changes and check a defect of the unit module.

In another specific example, the battery pack may further include a cooling system configured to cool the unit modules by a liquid refrigerant.

When the first gas changes in flow direction and flow rate at a portion of the cooling system, at which the liquid refrigerant leaks, the cooling system may be determined as a defective cooling system. Also, the cooling system may include a plurality of refrigerant conduits, and the portion of the cooling system, at which the refrigerant leaks, may be the refrigerant conduits or portions at which the refrigerant conduits are connected to each other.

That is, when the liquid refrigerant leaks from the refrigerant conduits constituting the cooling system and joints in which the refrigerant conduits are connected to each other, the first gas may change in flow direction around the refrigerant conduit or the joint in which the leakage occurs, due to a leakage pressure of the liquid refrigerant, and the flow rate may also change at the same time. In addition, the first gas may decrease in density and become blurred around the refrigerant conduit or the joint.

Therefore, the operator may recognize these changes and check a defect of the refrigerant conduit or the joint in which the refrigerant conduits are connected to each other.

In another specific example, when the first gas leaks outward from the inside of the pack housing through a damaged portion due to the damage of the pack housing, the leakage of the first gas may be visually identified to determine the pack housing as a defective pack housing.

In addition, the method may include feeding a second gas during or after the exhaust of the first gas to promote discharge of first gas particles adsorbed inside the battery pack.

The second gas may include the air or nitrogen, but not limited thereto.

The present disclosure may also provide a battery pack determined as a good product by means of the method.

It may be understood that the battery pack can achieve the high power and large capacity by configuring an assembly with a plurality of battery cells which is a power unit, and the battery pack may be realized in a wide variety of structures depending on the configuration method.

In one example, the battery pack may includes: a battery module assembly in which unit modules including one or more battery cells are arranged and combined; a tray assembly, as a pack housing, including the battery module assembly mounted on the top surface thereof; a cover member having an outer circumference, wherein the outer circumference thereof and an outer circumference of the tray assembly are coupled to face each other, on the top surface of the tray assembly in a state in which the battery module assembly is disposed; and a sealing gasket interposed between the outer circumference of the tray assembly and the outer circumference of the cover member which are coupled to face each other.

The cover member or the tray assembly may have an open region so that the first gas and the second gas are fed and discharged. In some cases, a pack cover may be further mounted on the open region in a state in which the first gas and the second gas are discharged.

Although a type of the battery cell that is the power unit is not particularly limited, specific examples of the batter cell may be a lithium secondary battery such as a lithium ion (Li-ion) secondary battery, a lithium polymer (Li-polymer) secondary battery, and a lithium ion polymer (Li-ion polymer) secondary battery, having advantages such as high energy density, high discharge voltage, and output stability.

Generally, the lithium secondary battery may include a positive electrode, a negative electrode, a separator, and a non-aqueous electrolyte containing a lithium salt.

The positive electrode is manufactured, for example, by applying a mixture of a positive electrode active material, a conductive material, and a binder onto a positive electrode current collector and/or an extension current collecting part and then drying the resultant, and if necessary, a filler may be further added to the mixture.

The positive electrode current collector and/or the extension current collecting part have/has a thickness ranging from about 3 μm to about 500 μm. The positive electrode current collector and the extension current collecting part are not particularly limited as long as they have high conductivity without causing a chemical change in the corresponding battery. For example, the positive electrode current collector and the extension current collecting part may include stainless steel, aluminum, nickel, titanium, baked carbon, or aluminum or stainless steel with a surface treated with carbon, nickel, titanium, or silver. The positive electrode current collector and the extension current collecting part may have a finely uneven surface to improve bonding strength with respect to an positive electrode active material, and may include various shapes such as a film, a sheet, foil, a net, a porous body, a foam body, or a non-woven body.

Examples of the positive electrode active material may include: a layered compound such as a lithium cobalt oxide ($LiCoO_2$) and a lithium nickel oxide ($LiNiO_2$), or a compound substituted with one or more transition metals; a lithium manganese oxide such as $Li_{1+x}Mn_{2-x}O_4$ (where, x=0–0.33), $LiMnO_3$, $LiMn_2O_3$, and $LiMnO_2$; a lithium copper oxide ($Li_2CuO_2$); a vanadium oxide such as $LiV_3O_8$, $LiFe_3O_4$, and $V_2O_5$, $Cu_2V_2O_7$; a Ni-site type lithium nickel oxide expressed by a chemical formula $LiNi_{1-x}MxO_2$ (where M=Co, Mn, Al, Cu, Fe, Mg, B, or Ga, and x=0.01–0.3); a lithium manganese composite oxide expressed by a chemical formula $LiMn_{2-x}M_xO_2$ (where M=Co, Ni, Fe, Cr, Zn, or Ta, and x=0.01–0.1) or a chemical formula $Li_2Mn_3MO_8$ (M=Fe, Co, Ni, Cu, or Zn); $LiMn_2O_4$ where a portion of the Li of the chemical formula is substituted with alkaline earth metal ions; a disulfide compound; and $Fe_2(MoO_4)_3$, but not limited thereto.

Generally, the conductive material is added at 1 wt % to 30 wt % on the basis of the total weight of the mixture including the positive active material. The conductive material is not particularly limited as long as it has electrical conductivity without causing a chemical change in the corresponding battery. For example, the conductive material may include: graphite such as natural graphite and artificial graphite; carbon black such as carbon black, acetylene black, Ketjen black, channel black, furnace black, lamp black, and thermal black; a conductive fiber such as a carbon fiber and a metal fiber; metal powder such as fluorocarbon, aluminum, and nickel powder; a conductive whisker such as a zinc oxide and potassium titanate; a conductive metal oxide such as a titanium oxide; and a conductive material such as a polyphenylene derivative.

The binder is a substance that assists in binding of the active material and the conductive material and binding to the current collector, and generally added at 1 wt % to 30 wt % on the basis of the total weight of the mixture including the positive electrode active material. For example, the binder may include: polyfluorovinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene-terpolymer (EPDM), sulfonated EPDM, stylene butylene rubber, fluoro rubber, and various copolymers.

The filler is selectively used as a substance for suppressing expansion of the positive electrode, and is not particularly limited as long as it is a fibrous material without causing a chemical change in the corresponding battery. For example, the filler includes: an olefin-based copolymer such as polyethylene and polypropylene; and a fibrous material such as a glass fiber and a carbon fiber.

The negative electrode is manufactured by applying a negative electrode active material onto a negative electrode current collector and/or an extension current collecting part and then drying the resultant, and if necessary, substances described above may be selectively further included.

The negative electrode current collector and/or the extension current collecting part have/has a thickness ranging from about 3 μm to about 500 μm. The negative electrode current collector and the extension current collecting part are not particularly limited as long as they have conductivity without causing a chemical change in the corresponding battery. For example, the negative electrode current collector and the extension current collecting part may include copper, stainless steel, aluminum, nickel, titanium, baked carbon, copper or stainless steel with a surface treated with carbon, nickel, titanium, or silver, or an aluminum-cadmium alloy. In addition, like the positive electrode current collector, the negative electrode current collector may have a finely uneven surface to improve bonding strength with respect to a negative electrode active material, and may include various shapes such as a film, a sheet, foil, a net, a porous body, a foam body, or a non-woven body.

For example, the negative electrode active material may include: carbon such as non-graphitized carbon and graphitized carbon; a metal composite oxide such as $LixFe_2O_3$ (0≤x≤1), $LixWO_2$ (0≤x≤1), and $Sn_xMe_{1-x}Me'_yO_z$ (Me: Mn, Fe, Pb, Ge; Me': Al, B, P, Si, Group I, II and III elements of the Periodic Table, halogen atoms; 0<x≤1; 1≤y≤3; and 1≤z≤8); a lithium metal; a lithium alloy; a silicon-based alloys; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; and a Li—Co—Ni based material.

The separator are interposed between the positive electrode and the negative electrode, and an insulating thin film having high ion permeability and mechanical strength is used as the separator and the separating film. The separator typically has a pore diameter of 0.01 to 10 μm and a thickness of 5 to 300 μm. For example, the separator includes: an olefin-based polymer such as polypropylene that has chemical resistance and hydrophobicity; and a sheet or a non-woven fabric formed of a glass fiber and polyethylene. When a solid electrolyte such as a polymer is used as the electrolyte, the solid electrolyte may serve as the separator.

The electrolyte may be a non-aqueous electrolyte containing lithium salt, and may include the non-aqueous electrolyte and the lithium salt. As the non-aqueous electrolyte, a non-aqueous organic solvent, an organic solid electrolyte, and an inorganic solid electrolyte are used, but limited thereto.

For example, the non-aqueous organic solvent may include an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric acid tri-ester, trimethoxy methane, a dioxolane derivative, sulfolan, methyl sulfolan, 1,3-dimethyl-2-imidazolidinone, a propylene carbonate derivative, a tetrahydrofuran derivative, ether, methyl propionate, and ethyl propionate.

For example, the organic solid electrolyte may include a polyethylene derivative, a polyethylene oxide derivative, a polypropylene oxide derivative, a phosphoric acid ester polymer, poly agitation lysine, polyester sulfide, polyvinyl alcohol, poly vinylidene fluoride, and a polymer including an ionic dissociation group.

For example, the inorganic solid electrolyte may include a nitride, a halide, and a sulfate of the lithium, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

For example, the lithium salt may include a material easily dissolved in the non-aqueous electrolyte, such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lithium lower aliphatic carbonate, lithium 4-phenyl borate, imide, and the like.

Also, for example, the non-aqueous electrolyte may include pyridine, triethyl phosphite, triethanolamine, cyclic ether, ethylenediamine, n-glyme, hexaphosphoric triamide, a nitrobenzene derivative, sulfur, a quinone-imine dye, N-substituted oxazolidinone, N,N-substituted imidazolidine, ethylene glycol dialkyl ether, an ammonium salt, pyrrole, 2-methoxyethanol, and aluminum trichloride, which are added to the non-aqueous electrolyte, in order to improve discharge and charge characteristics and flame retardancy. In some cases, a halogen-containing solvent such as carbon tetrachloride and ethylene trifluoride may be further included so as to provide non-combustibility, and a carbon dioxide gas may be further included so as to improve high-temperature storage characteristics. In addition, FEC (Fluoro-Ethylene Carbonate) and PRS (Propene sultone) may be further included.

In one specific example, the lithium salts such as $LiPF_6$, $LiClO_4$, $LiBF_4$, $LiN(SO_2CF_3)_2$ may be added to a mixed solvent of cyclic carbonate such as EC or PC that is a highly dielectric solvent and linear carbonate such as DEC, DMC or EMC that is a low-viscosity solvent, to thereby manufacturing a non-aqueous electrolyte containing lithium salt.

In addition, the present disclosure provides a device including the above-described battery pack. The device may be any one selected from the group consisting of electric vehicles, hybrid electric vehicles, plug-in hybrid electric vehicles, or power storage devices.

Since the devices are well known in the art, detailed descriptions thereof will be omitted in this disclosure.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, although the present disclosure is described with reference to the drawings in accordance with exemplary embodiments, this is intended to provide a further comprehension of the present disclosure, and the scope of the present disclosure is not limited thereto.

Figure 1:
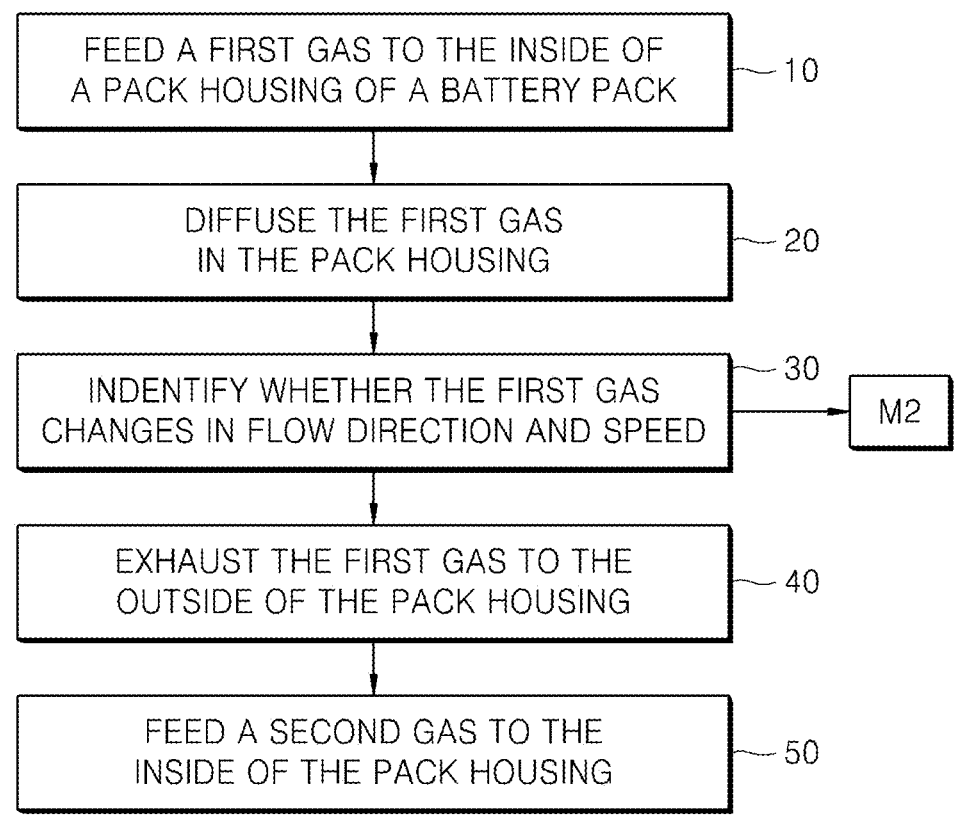
FIG. 1 is a flowchart with respect to a method for checking a defect of a battery pack in accordance with an exemplary embodiment.
Figure 2:
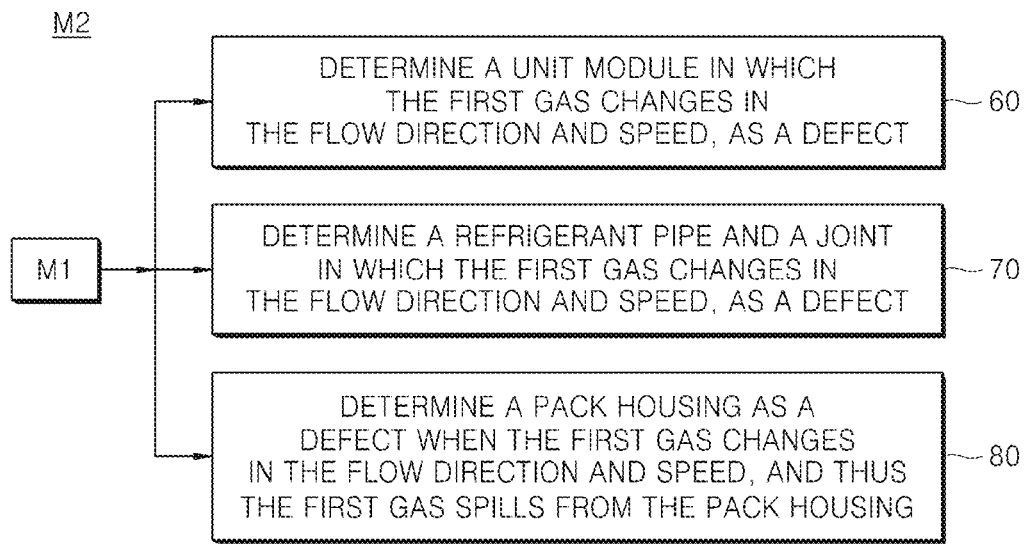
FIG. 2 is a block diagram with respect to a reference for checking a defect in accordance with an exemplary embodiment.
Figure 3:
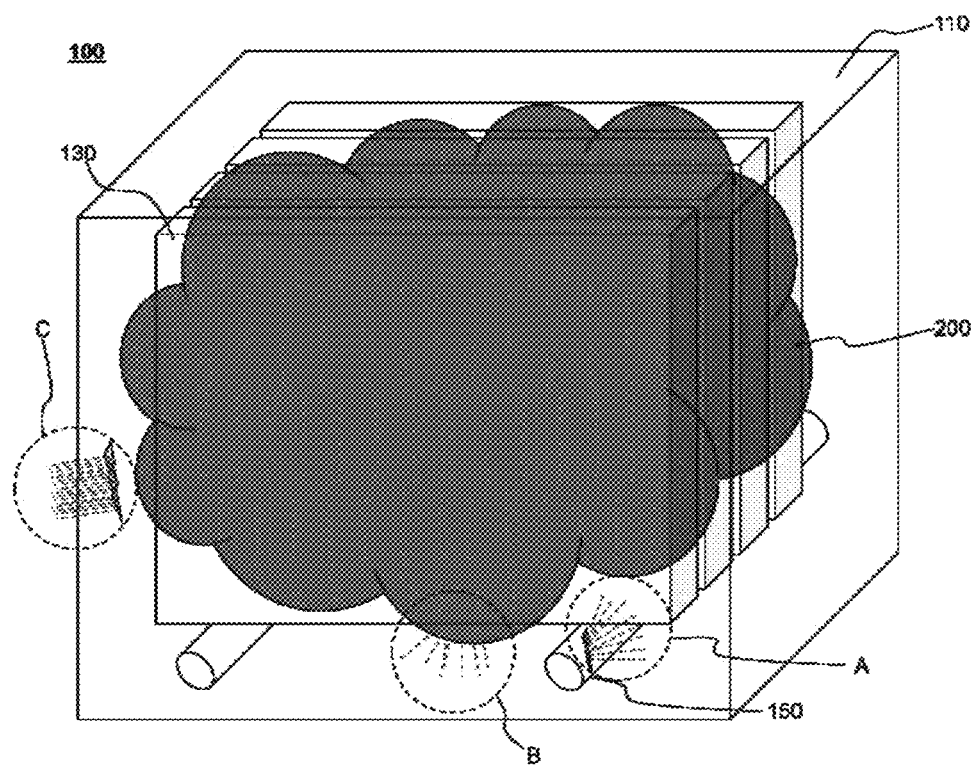
FIG. 3 is a schematic view of a battery pack in accordance with an exemplary embodiment.

FIG. 1 illustrates a flowchart with respect to a method for checking a defect of a battery pack in accordance with an exemplary embodiment, and FIG. 2 illustrates a reference for checking a defect in accordance with an exemplary embodiment. Also, FIG. 3 illustrates a schematic view of a battery pack in accordance with an exemplary embodiment.

Hereinafter, a method in accordance with exemplary embodiments is described in detail with reference to these drawings.

First, according to a method (M1) of an exemplary embodiment, a first gas 200 having a red color is fed into a pack housing 110 of a battery pack 100 in a process (10). The first gas 200 has a color, and thus an operator may visually recognize diffusion of a gas, a flow direction of a gas, and a flow rate of a gas.

In a process (20), the first gas 200 fed in the process (10) is diffused within the pack housing 110, and thus the inside of the pack housing 110 is filled with the first gas 200.

As described above, when the pack housing 100 is filled with the first gas 200, the operator visually identifies whether the first gas 200 changes in flow direction and flow rate in a process (30).

If there is a change in flow direction and flow rate, a method (M2) proceeds.

The gas diffuses and, at the same time, changes in flow direction and flow rate, due to pressure variations, at portions at which a liquid leaks, a gas leaks, and the housing 110 is damaged.

Based on this principal, since the first gas 200 has a color and thus is visually identifiable, the first gas 200 is used to check a defect of the battery pack 100 in the present disclosure.

Particularly, when the first gas 200 changes in flow direction and flow rate in a unit module 130, in which an electrolyte or a gas leaks, the unit module 130 of the unit modules is determined as a defective unit module.

When the electrolyte or the gas leaks from a battery cell constituting the unit cell 130, a flow direction of the first gas 200 changes due to a leakage pressure of the electrolyte or the gas, at a portion (B) of the unit module 130 at which the leakage occurs, and the flow rate also changes at the same time. In addition, the first gas 200 decreases in density and becomes blur around the portion (B) of the unit module 130.

Therefore, the operator may check a defect of the unit module 130 on the basis of these changes.

Also, when a liquid refrigerant leaks from refrigerant conduits 150 constituting a cooling system and joints in which the refrigerant conduits 150 are connected to each other, a flow direction of the first gas 200 changes due to a leakage pressure of the liquid refrigerant, in a portion (A) of the refrigerant conduit 150 at which the leakage occurs, and the flow rate also changes at the same time. In addition, the first gas 200 decreases in density and becomes blur around the portion (A) of the refrigerant conduit 150.

Therefore, the operator may check a defect of the cooling system on the basis of these changes.

In addition, when damage such as crack or split occurs in the pack housing 110, the first gas 200 leaks outward from the inside of the pack housing 110 through the damaged portion (C). A flow direction of this leakage would changes from the inside to the outside of the pack housing 110, and a flow rate of the first gas 200 that leaks would change in the outside.

Therefore, the operator visually identifies, at the outside of the pack housing 110, that the first gas 200 leaks, and thus the operator may check a defect of the pack housing 110.

As described above, according to a method of an exemplary embodiment, the operator for checking a defect may visually perceive the diffusion, the flow direction and the flow rate of the first gas 200 having the color, and thus the operator may easily recognize the change in flow direction and flow rate to simultaneously check defects such as the liquid leakage, the gas leakage, and the damage of the pack housing 110 over the entire battery pack 100.

In a process (40), the first gas 200 is exhausted to the outside. The above-described exhaust is performed by opening the pack housing 110 or by using an opening that may be formed in the pack housing 110. Alternatively, when the pack housing has a shape in which a portion of the pack housing 110 is open, the first gas 200 is allowed to be exhausted naturally. This may be appropriately performed depending on a structure of the battery pack 100.

Here, in a process (50), a second gas including non-reactive air or nitrogen is fed into the pack housing 110, and the second gas promotes discharge of particles of the first gas 200 adsorbed inside the battery pack 100.

In some cases, the second gas may be fed, simultaneously with the exhaust of the first gas 200 to promote the exhaust of the first gas 200.

Figure 4:
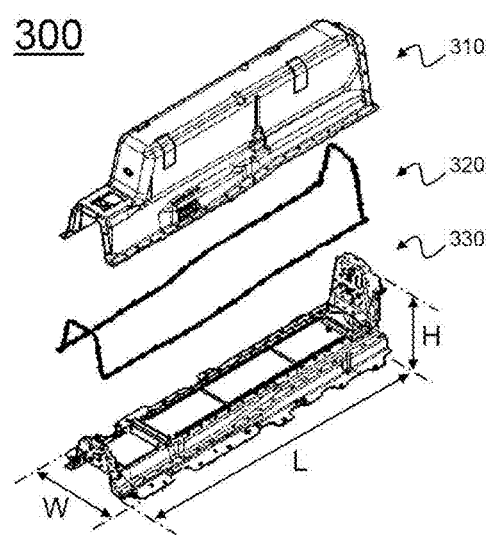
FIG. 4 is a schematic view of a battery pack in accordance with another exemplary embodiment.

FIG. 4 illustrates a schematic view of a battery pack in accordance with another exemplary embodiment.

Referring to FIG. 4, a battery pack 300 includes: a tray assembly 330 including a battery module assembly (not shown) mounted on the top surface thereof; a cover member 310 having an outer circumference, wherein the outer circumference thereof and an outer circumference of the tray assembly 330 are coupled to face each other, on the top surface of the tray assembly 330 in a state in which the battery module assembly is disposed; and a sealing gasket 320 interposed between the outer circumference of the tray 330 and the outer circumference of the cover member 310 which are coupled to face each other.

The battery pack 300 has a limited mounting space due to vehicle components disposed at a high degree of integration. Therefore, the battery module assembly constituting the battery pack 300 has a rectangular parallelepiped structure in which a height (H) is greater than a width (W), and a forward and backward length (L) is greater than the height (H) so that the battery module assembly is mounted on a small space, for example, a space between a driver seat and a passenger seat. Accordingly, the battery pack 300 has a rectangular parallelepiped or a tunnel structure corresponding to that of the battery module assembly.

As described above, according to the method of the present disclosure, an operator for checking a defect may visually perceive the diffusion, and the flow direction and the flow rate of the first gas having the color, and thus the operator may easily recognize the change in flow direction and flow rate to simultaneously check defects such as the liquid leakage, the gas leakage, and the pack housing damage over the entire battery.

Although the present disclosure is described with reference to the drawings in accordance with exemplary embodiments, it will be apparent by those skilled in the art that various applications and modifications can be made thereto, on the basis of the above-descriptions, within the scope of the present disclosure.

What is claimed is:

1. A method for checking defects including a liquid leakage, a gas leakage, and pack housing damage in a battery pack in which a plurality of unit modules comprising a battery cell are arranged in a pack housing, the method comprising:

feeding a first gas into the pack housing of the battery pack, wherein the first gas has one or more colors selected from red, green, and blue colors configured to be visually identified in diffusion and flow, and wherein the first gas diffuses throughout the pack housing;

checking whether the defects occur by visually identifying a point at which a flow direction and a flow rate of the first gas change, when the first gas diffuses in the pack housing; and exhausting the first gas to the outside of the pack housing, wherein the defects of the battery pack are simultaneously identified by the first gas diffusing into the entire pack housing, and wherein the pack housing includes:
a tray assembly on which the plurality of unit modules is disposed, and
a cover member coupled to the tray assembly with a sealing gasket interposed therebetween, wherein the defects are visually identified through the pack housing.

2. The method of claim 1, wherein, when the first gas changes in flow direction and flow rate in a unit module from which an electrolyte or a gas leaks, the unit module of the unit modules is determined as a defective module.

3. The method of claim 2, wherein the first gas changes in flow direction and flow rate due to a leakage pressure of the electrolyte or the gas.

4. The method of claim 1, wherein the battery pack further comprises a cooling system configured to cool the unit modules by using a liquid refrigerant, and when the first gas changes in flow direction and flow rate at a portion of the cooling system, at which the liquid refrigerant leaks, the cooling system is determined as a defective cooling system.

5. The method of claim 4, wherein the cooling system comprises a plurality of refrigerant conduits, and the portion of the cooling system, at which the refrigerant leaks, is the refrigerant conduits or portions at which the refrigerant conduits are connected to each other.

6. The method of claim 4, wherein the first gas changes in flow direction and flow rate due to a leakage pressure of the liquid refrigerant.

7. The method of claim 1, wherein when the first gas leaks outward from the inside of the pack housing through a damaged portion due to the damage of the pack housing, the leakage of the first gas is visually identified to determine the pack housing as a defective pack housing.

8. The method of claim 1, wherein the color comprises a lemon yellow, yellowish green, reddish brown, or black color produced by combining the red, green, and blue colors.

9. The method of claim 1, wherein the first gas comprises one or more halogen gases selected from fluorine, chlorine, bromine, and iodine.

10. The method of claim 1, comprising feeding a second gas during or after the exhaust of the first gas to promote discharge of first gas particles adsorbed inside the battery pack.

11. The method of claim 10, wherein the second gas comprises the air or nitrogen.

12. A battery pack determined as a good product by means of the method of claim 1.

* * * * *